United States Patent [19]

Suzuki et al.

[11] Patent Number: 4,710,297
[45] Date of Patent: Dec. 1, 1987

[54] FLUID FILTER WITH PLEATED FILTER MEDIUM

[75] Inventors: Mitsutoshi Suzuki, Kawagoe; Yoshitaka Morita, Fussa; Masami Okada, Ichikawa; Jun Shimohara, Kamifukuoka, all of Japan

[73] Assignee: Kabushiki Kaisha Tsuchiya Seisakusho, Tokyo, Japan

[21] Appl. No.: 845,842

[22] Filed: Mar. 28, 1986

[30] Foreign Application Priority Data

Jun. 15, 1985 [JP] Japan .................................. 60-130356
Sep. 30, 1985 [JP] Japan .................................. 60-218836
Nov. 29, 1985 [JP] Japan ............................ 60-184344[U]
Dec. 28, 1985 [JP] Japan .................................. 60-297388

[51] Int. Cl.$^4$ ........................................... F02M 35/00
[52] U.S. Cl. ............................... 210/493.2; 210/493.5; 55/498; 55/502; 55/521
[58] Field of Search ................... 55/498, 500, 502, 521, 55/524; 210/493.1, 493.5, 497.3, 506, 493.2

[56] References Cited

U.S. PATENT DOCUMENTS

| 2,410,371 | 3/1944 | Vokes. | |
| 2,823,760 | 2/1958 | Anderson | 55/500 |
| 3,235,633 | 2/1966 | Holloway et al. | 55/502 |
| 3,640,396 | 2/1972 | Brownell | 55/498 |
| 3,799,354 | 3/1974 | Buckman et al. | 55/521 |
| 3,859,068 | 1/1975 | McLaren et al. | 55/498 |
| 4,292,055 | 9/1981 | De Castella et al. | 55/498 |
| 4,303,426 | 12/1981 | Battis | 55/502 |
| 4,363,753 | 12/1982 | Bozon et al. | 252/477 |

FOREIGN PATENT DOCUMENTS

| 2342155 | 3/1975 | Fed. Rep. of Germany. |
| 2715679 | 10/1978 | Fed. Rep. of Germany. |
| 2937757 | 4/1981 | Fed. Rep. of Germany. |
| 961806 | 6/1964 | United Kingdom. |
| 2030464 | 4/1980 | United Kingdom. |
| 831143 | 5/1981 | U.S.S.R.. |

Primary Examiner—Richard V. Fisher
Assistant Examiner—Jeffery W. Peterson
Attorney, Agent, or Firm—Schwartz, Jeffery, Schwaab, Mack, Blumenthal & Evans

[57] ABSTRACT

An air filter element consists of an annularly arranged pleated filter medium having a plurality of radially extending pleats. Two sides or legs of each pleat are bonded to each other at the outer peripheral side to form an outer bonded section while one sides or legs of the adjacent pleats are bonded to each other at the inner peripheral side to form an inner bonded section, thereby forming a fluid path extending between the adjacent pleats along the length of each pleat. Additionally, outer and inner resilient seal members are so provided that a part of each outer bonded section is embedded in the outer seal member while a part of each inner bonded section is embedded in the inner sealing member.

31 Claims, 34 Drawing Figures

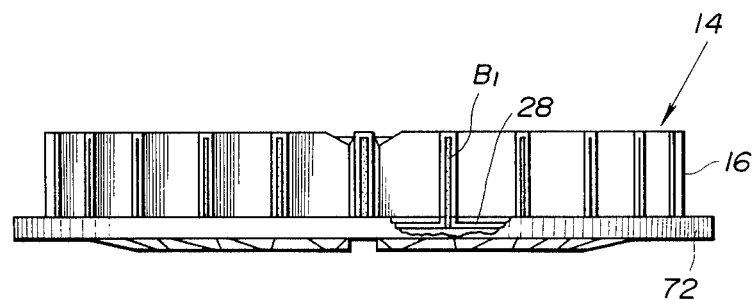
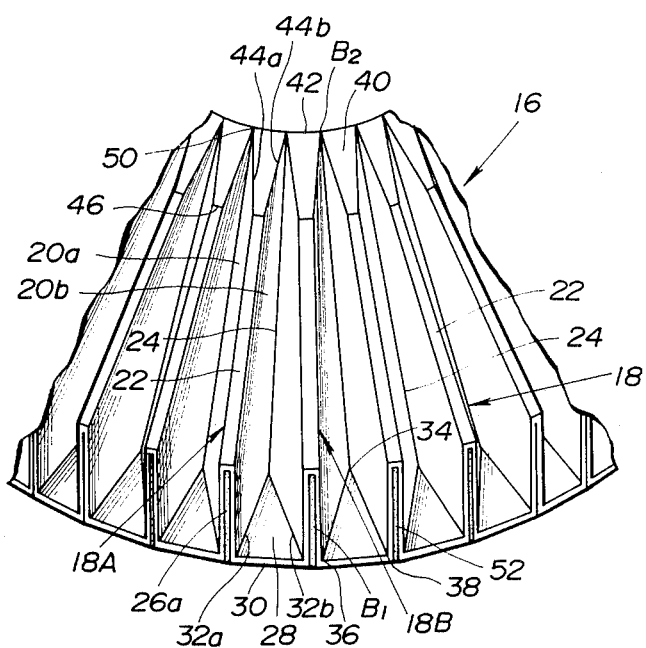

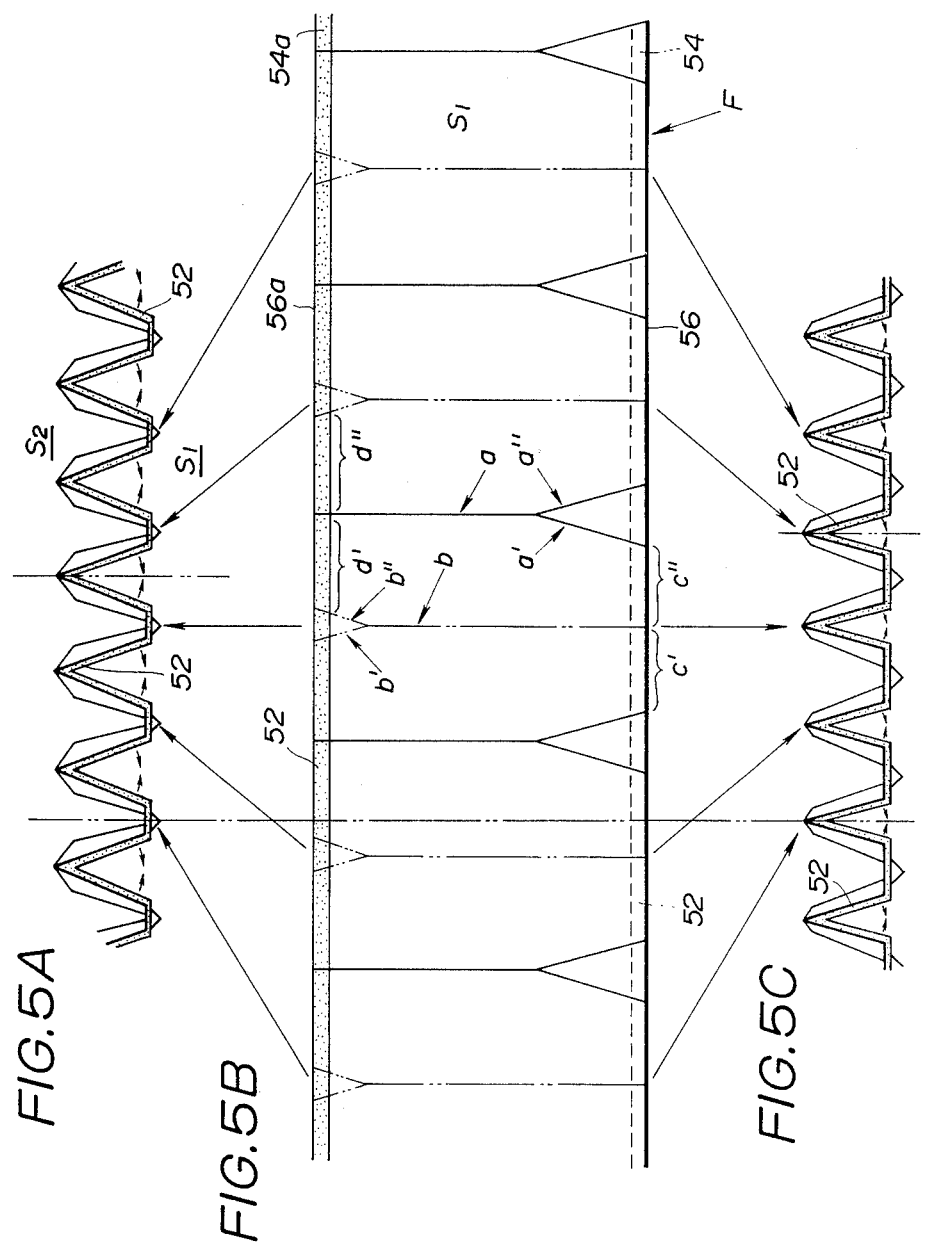

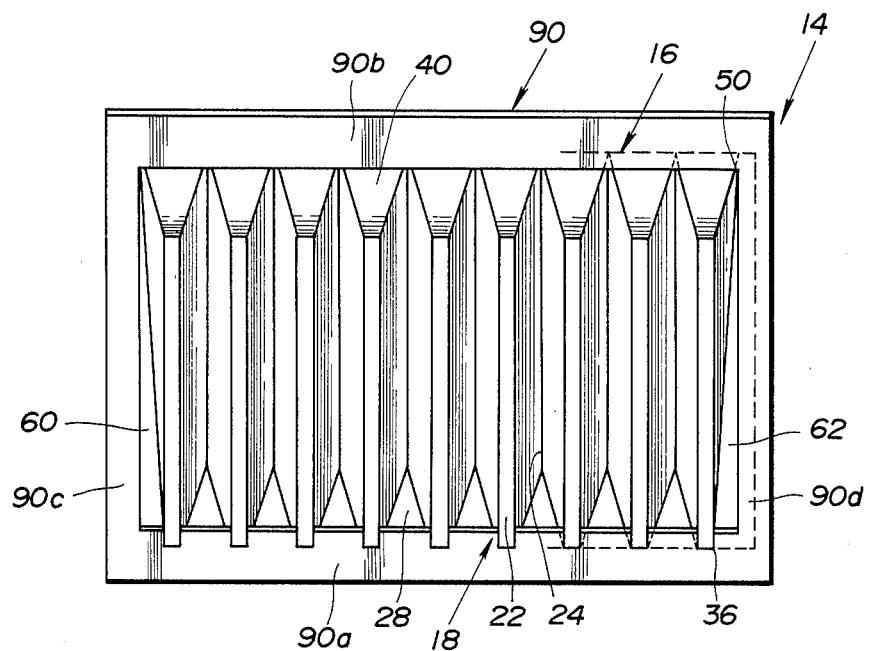
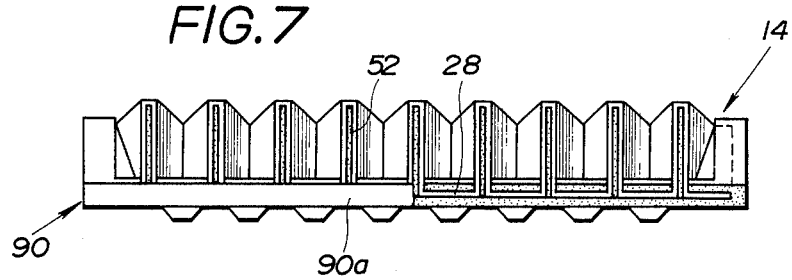
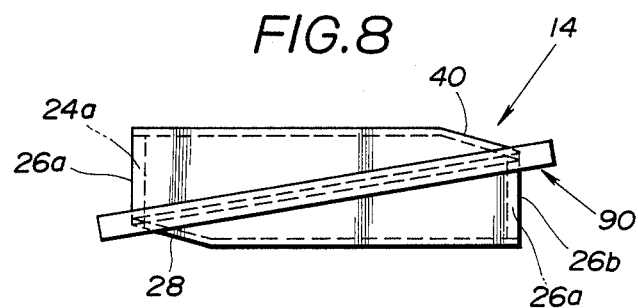

FLUID FILTER WITH PLEATED FILTER MEDIUM

BACKGROUND OF THE INVENTION

1. Field of the Invention

The present invention relates generally to fluid filters for filtering fluids such as air, fuel, lubricating oil and hydraulic fluid used in internal combustion engines to remove impurities such as dust and metal powders therefrom, and more particularly to an improvement in an pleated filter medium of such fluid filters thereby to attain a higher filtering ability and a longer filter life.

2. Description of the Prior Art

Most automotive internal combustion engines are equipped with air and lubricating oil filters whose filter element usually consists of a pleated filter medium formed of a sheet-type filter material such as filter paper or nonwoven fabric. The pleated filter medium is generally annular and has a plurality of longitudinally extending pleats. A pair of end plates are sealingly attached to the opposite ends of the annular filter medium by means of adhesive, securely disposing an inner perforated cylinder along the inner periphery of the annular filter medium. Additionally, a pair of fluid sealing members are securely attached to the end plates, respectively, thus constituting the filter element. With such a filter element, fluid such as air or lubricating oil to be filtered flows perpendicularly to the filter medium, i.e., the fluid is introduced through the outer peripheral face of the filter medium and gets out through the inner peripheral face of the filter medium in which dust and the like are removed and retained on the surface of the filter medium.

However, various drawbacks have been encountered in such conventional filters as discussed hereinafter. (1) Since the surface area of the inner periphery of the filter medium is considerably smaller than that of the outer periphery of the same, flow resistance of the fluid passing through the filter medium depends on the smaller surface area of the filter media inner periphery, thereby increasing the flow resistance considerably over a level corresponding to the larger surface area of the filter medium outer periphery. (2) Close contact between the adjacent pleats occurs with passage of the fluid and with progress of clogging of the filter medium. This decreases the effective filtering area of the filter medium, thereby shortening the life of the filter. (3) In a state where the filter element is installed in a casing, it is usual that the fluid to be filtered flows perpendicularly to the outer peripheral face of the filter medium and passes through the filter medium, and thereafter the flow direction of the fluid is bent approximately right angles to get out through an fluid outlet pipe provided at the central part of the casing. This increases the flow resistance of the fluid flowing through the filter. (4) The fluid introduced inside the casing through the fluid inlet pipe cannot be uniformly distributed throughout whole the outer peripheral face of the filter medium so that the fluid is sucked in larger amount through a part near the air inlet pipe and in smaller amount through a part remote from the air inlet pipe. Accordingly, the filtration rate at the part near the inlet becomes higher than an appropriate value while the fluid is difficult to flow at the part remote from the inlet. As a result, it is impossible to obtain a higher filtering accuracy and a longer life of the filter. (5) Since the pitch of the pleats is smaller at the filter medium inner periphery than at the outer periphery, the flow resistance and the life unavoidably depend on the pleat pitch of the filter medium inner periphery. Accordingly, if the number of the pleats is increased and the width of each pleat is enlarged for the purpose of lowering the flow resistance and prolong the life, effects thereon are hardly expected.

SUMMARY OF THE INVENTION

A fluid filter according to the present invention consists of a filter element including a pleated filter medium having a plurality of pleats such as adjacent first and second pleats. Each pleat includes first and second sides which are integrally connected through an upper main score line with each other to form an upwardly-pointing pleat. The second side of the first pleat and the first side of the second pleat is integrally connected through a lower main score line with each other to form a downwardly-pointing pleat. Each pleat side has oppositely located first and second end sections which have first and second edges, respectively, which extend substantially perpendicular to each score line. The first end sections of the first pleat first and second sides are approached and bonded to each other thereby to form a first bonded section. Additionally, the second end section of the first pleat second side and second end section of the second pleat first side are approached and bonded to each other to form a second bonded section.

By virtue of the filter medium configured such that the upwardly-pointing pleat and the downwardly-pointing pleat are alternately closed and opened at their opposite ends, the flow path of a fluid to be filtered is formed nearly along the length of each pleat in which filtration is accomplished in a process of the fluid flowing along the pleat length so that impurities are uniformly retained throughout whole the filter medium. Accordingly, the fluid to be filtered is uniformly distributed throughout whole the surface of the filter medium, thereby uniformalizing flow of the fluid flowing through the filter medium and filtration rate. Additionally, a sufficient clearance is securely formed between adjacent pleats even at inner periphery of the filter medium and therefore the adjacent pleats are prevented from close contact to each other even if clogging of the filter medium progresses, thereby increasing effective filtration area, Thus, the filter medium of the present invention effectively improves filtration accuracy and prolongs the life of the filter element.

BRIEF DESCRIPTION OF THE DRAWINGS

The features and advantages of the fluid filter according to the present invention will be more clearly appreciated from the following description taken in conjunction with the accompanying drawings in which like reference numerals designate corresponding elements and parts, in which:

FIG. 3 is a front elevation of the filter element of FIG. 2;

FIG. 4 is a fragmentary perspective view of a filter medium used in the filter element of FIG. 2;

FIGS. 5A to 5C are illustrations showing a method of forming the filter medium by pleating a flat filter material, in which FIG. 5B is a plan view of the flat filter material with scores and adhesive applied thereon, and FIGS. 5A and 5B are side views of the filter material after being pleated, respectively;

FIG. 6 is a plan view of a filter element of a second embodiment of the fluid filter in accordance with the present invention;

FIG. 7 is a front elevation of the filter element of FIG. 6;

FIG. 8 is a side view of the filter element of FIG. 7;

DETAILED DESCRIPTION OF THE INVENTION

Figure 1:
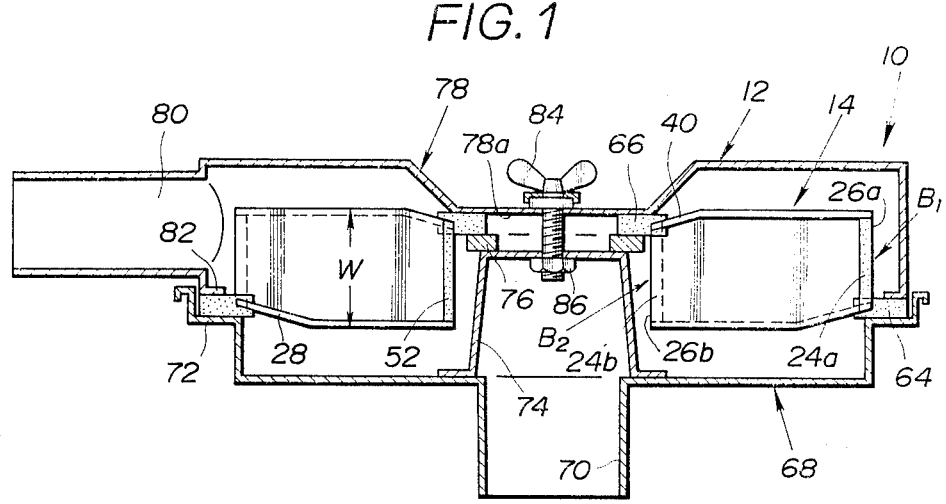
FIG. 1 is a vertical sectional view of a first embodiment of the fluid filter in accordance with the present invention.
Figure 2:
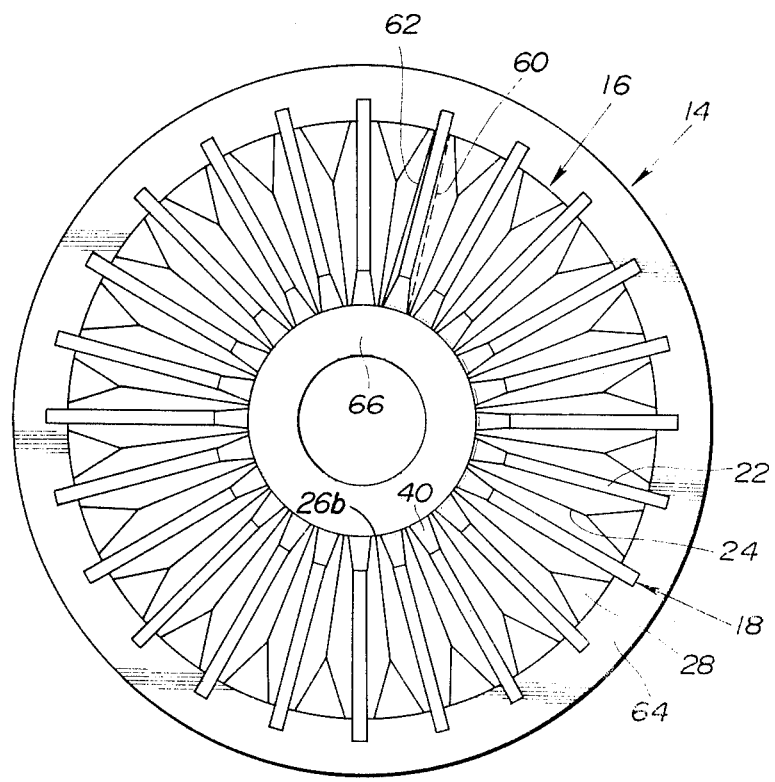
FIG. 2 is a plan view of a filter element of the fluid filter of FIG. 1.
Figure 9:
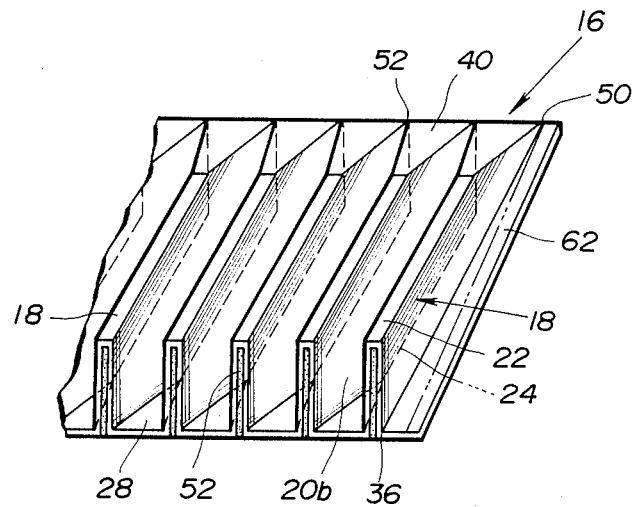
FIG. 9 is a fragmentary perspective view of a filter medium of the filter element of FIG. 6.
Figure 10:
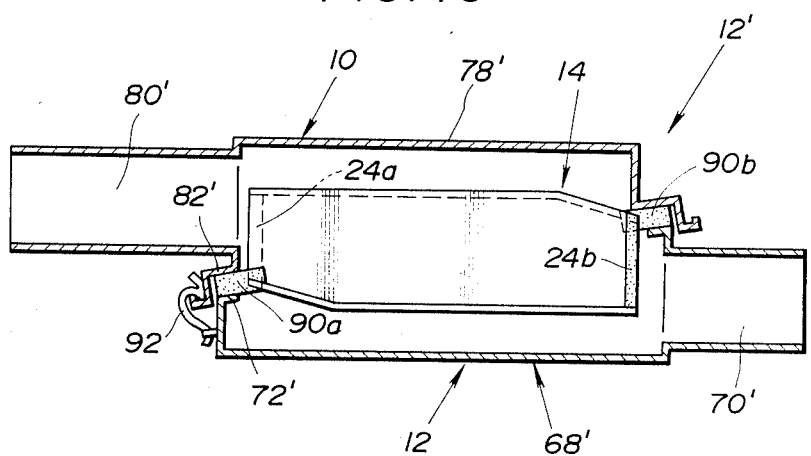
FIG. 10 is a vertical sectional view of the second embodiment fluid filter.

Referring now to FIGS. 1, 2, 3 and 4, there is shown a first embodiment of a fluid filter in accordance with the present invention. This embodiment is directed to an air filter 10 for an automotive internal combustion engine. The air filter 10 comprises a casing 12 within which a filter element 14 is securely disposed to remove dust contained in air to be supplied to the engine. As shown in FIGS. 2 and 3, the filter element 14 consists of a pleated filter medium 16 formed of a sheet-type filter material such as a filter paper or a nonwoven fabric. The filter medium 16 is formed annular in this embodiment. As clearly shown in FIG. 4, the filter medium 16 includes a plurality of pleats 18 which extend radially between the inner and outer peripheries of the filter medium 16.

The structure of the filter medium 16 will be discussed hereinafter particularly with reference to FIGS. 4 in which adjacent two (first and second) pleats 8A, 8B are shown forming part of the plurality of pleats 8. Each pleat 18A, 18B includes first and second sides 20a, 20b which are integrally connected or contiguous through a upper or first main score line 22 thereby to form an upwardly-pointing pleat corresponding to that 8A. Additionally, the second side 20a of the first pleat 18A is integrally connected or contiguous through a lower or second main score line 24 with the first side 20a of the second pleat 18B thereby to form a downwardly-pointing pleat (not identified). Each pleat side 20a, 20b has outer and inner (first and second) end sections 24a, 24b which contain outer and inner first and second edges 26a, 26b, respectively, edge 26b is best seen from FIG. 1. It will be understood that each edge 26a, 26b is perpendicular to the upper main score line 22.

The outer end sections 24a, 24a of the outer and inner sides of each pleat 18 (18A, 18B) are approached and bonded with each other by means of an adhesive, thus forming an outer or first bonded section B₁. The inner end section 24b of the second side 20b of the first pleat 18A is approached and bonded to the inner end section 24b of the first side 20a of the second pleat 18B by means of an adhesive, thus forming an inner and second bonded section B₂. It will be understood that the outer end section 24a (containing the outer edge 26a) of the pleat side 20a, 20b extends from the upper main score line 22 and has a length slightly smaller than the width W of the pleat side. Similarly, the inner end section 24b containing the inner edge 26b of the pleat side 20a, 20b extends from the lower main score line 24 and has a length slightly smaller than the width W of the pleat side.

As clearly shown in FIG. 4, an outer or first inclined wall 28 of the shape of an isosceles triangle is formed between the first and second pleats 18A, 18B on the outer peripheral side. The outer inclined wall 28 has an edge 30 contiguous to the outer edges 26a of the pleat first and second sides 20a, 20b. The outer inclined wall 28 is integrally connected or contiguous through a first oblique score line 32a with the second side of the first pleat 18A and through a second oblique score line 32b with the first side 20a of the second pleat 18B. The first oblique score line 32a connects an end point 34 (on the outer peripheral side) of the lower main score line 24 and a point 36 lying at the border of the outer edge 26a of the second side 20b of the first pleat 18A and the edge 30 of the outer inclined wall 28. The second oblique score line 32b connects the end point 34 of the lower main score line 24 and a point 38 lying at the border of the outer edge 26a of the first side 20a of the second pleat 18B and the edge 30 of the first inclined wall 28.

In addition, an inner or second inclined wall 40 of the shape of an isosceles triangle is formed contiguous to the upper main score line 22 and formed between the first and second sides 20a, 20b of each pleat 18 (18A, 18B) on the inner peripheral side. The inner inclined wall 40 has an edge 42 contiguous to the outer inner edges 26b of the first and second sides 20a, 20b of each pleat 18 (18A, 18B). The inner inclined wall 40 is integrally connected or contiguous through a third oblique score line 44a with the first side 20a of the pleat and through a fourth oblique score line 44b with the second side 20b of the pleat. The third oblique score line 44a connects an end point 46 (on the inner peripheral side) of the upper main score line 22 and a point 48 lying at the border between the inner edge 26b of the first side 20a of the pleat and the edge 42 of the inner inclined wall 40. The fourth oblique score line 44b connects the end point 46 of the upper main score line 22 and a point 50 lying at the border between the edge 42 of the second inclined wall 40 and the edge 26b of the second side 20b of the pleat.

To facilitate understanding the structure of the filter medium 16, a method of making the filter medium will be discussed with reference to FIGS. 5A, 5B and 5C. A filter material F such as a filter paper of the band type is scored by suitable means such as rolls (not shown), according to a pattern of FIG. 5B in which solid lines indicate scores formed on the front side $S_1$ (corresponding to the shown side of the filter medium in FIG. 4 of the filter medium 16) while broken lines indicate scores formed on the reverse side $S_2$. Each Y-shaped scores on the front side $S_1$ include a long straight score a, and two oblique short scores a′, a″ having the same length. The score a corresponds to the lower main score line 24 in the filter medium 16 shown in FIG. 4, while the scores a′, a″ correspond to the first and second oblique score lines 32a, 32b, respectively. Each Y-shaped scores on the reverse side $S_2$ include a long straight score b, and two oblique short scores b′, b″ having the same length. The score b corresponds to the upper main score line 22 of the filter medium 16 shown in FIG. 4, while the scores b′, b″ correspond to the third and fourth oblique score lines 44a, 44b, respectively.

An adhesive 52 is applied in the form of a band having a predetermined width onto the front side $S_1$ at a continuous end section 54a extending along an edge 56a. The adhesive is also applied in the same manner onto the reverse side $S_2$ at the other continuous end section 54b extending along the other continuous edge 56b. The major part of the continuous end section 54a forms the inner end sections 24b of the first and second sides 20a, 20b of the pleats 18. Similarly, the major part of the other continuous end section 54b forms the outer end sections 24a of the first and second sides 20a, 20b of the pleats 18.

Thereafter, the band type filter material F is pleated by suitable means such as a pleating machine (not shown), thereby being bent along the scores into a zig-zag shape as seen in FIGS. 5A and 5B in which the score a forms the top of the upwardly-pointing pleat while the score b forms the bottom of the downwardly-pointing pleat. Then, the sections c′, c″ of the end section 54b with the adhesive are approached and bonded to each other except for the section between the scores a′, a″ in such a manner as shown in FIG. 5C in which a part of the isosceles triangle shape formed by the scores a′, a″ corresponds to the outer inclined wall 28 of the filter medium 16 in FIG. 4. It will be understood that the sections c′, c″ correspond to the outer end sections 24a, 24a of the pleat first and second sides 20a, 20b illustrated in FIG. 1. Similarly, the sections d′, d″ of the end sections 54a with the adhesive are approached and bonded to each other except for the section between the scores b′, b″ in such a manner as shown in FIG. 5A in which a part of the isosceles triangle shape formed by the scores b′, b″ corresponds to the inner inclined wall 40 shown in FIG. 4. It will be understood that the sections c′, c″ correspond to the inner end sections 24b, 24b of the pleat first and second sides 20a, 20b illustrated in FIG. 1. The thus formed filter medium 16 will take a shape having a longer outer periphery and a shorter inner periphery. This is because the length of the edge 30 of the outer inclined wall 28 is larger than that of the edge 42 of the inner inclined wall 40. Subsequently, the initial end 60 and the terminal end 62 (shown in FIG. 2) of the filter medium 16 are bonded to each other, thereby forming the annular filter medium 16 as shown in FIG. 2.

Accordingly, the length of the outer periphery of the annular filter medium 16 corresponds to the total of the length of all the outer inclined wall edges 30 and the thickness of all the outer bonded sections $b_1$, while the length of the inner periphery of the same filter medium 16 corresponds to the total of the length of all the inner inclined wall edges 42 and the thickness of all the inner bonded sections $B_2$. It will be understood that the length of the edge 30, and of the first and second oblique score lines 32a, 32b defining each inner inclined wall 28, and the length of the edge 42 and of the third and fourth oblique score lines 44a, 44b defining the inner inclined wall 40 are suitably selectable for the purpose of altering length of the inner and outer peripheries of the annular filter medium and/or the width and length of the space formed between the adjacent pleats.

As seen from FIGS. 1 to 3, an outer annular resilient sealing member 64 is so provided that the radially outward section or outer peripheral section of the outer inclined walls 28 and the lower parts of the outer bonded sections $B_1$ is embedded therein. The outer sealing member 64 extends radially and outwardly in the shape of a flange. Additionally, an inner annular resilient sealing member 66 is so provided that the radially outward section or the outer peripheral section of the inner inclined walls 40 is embedded therein. The inner sealing member 66 extends radially and inwardly in the shape of a flange. The inner sealing member is in parallel relationship with the outer sealing member 64. The inner and outer sealing members 64, 66 are formed of a relatively soft plastic such as foamer polyurethane or polyvinyl chloride. It is preferable to form the sealing members 64, 66 of soft foamed polyurethane thereby improving its sealing ability. The inner and outer sealing members 66 are molded into the above-mentioned shape so that parts of the annular filter medium 16 are embedded therein, thus forming the filter element 14.

The filter element 14 as shown in FIGS. 2 and 3 are disposed within the casing 12 in a fashion shown in FIG. 1. The casing 12 includes a bowl-like body 68 which is formed at its central section with an air outlet pipe 70 through which air is sucked into the engine. The air outlet pipe 70 is located coaxial with the body 68. The body 68 is further formed at its outer periphery with an annular flange 72 extending radially and outwardly. Additionally, the body 68 is provided with a bridge member 74 extends in the opposite direction to the pipe 70. An annular flange member 76 is secured onto the top section of the bridge member 74. A cover 78 is detachably connected to the body 68 and formed with an air inlet pipe 80 through which air is supplied inside the casing 68. The cover 78 is formed at the lower periphery with a radially inwardly extending annular flange 82 facing the body annular flange 72. Additionally, the cover 78 is depressed at its central section to form a flat portion 78a facing the annular flange member 76. As illustrated in FIG. 1, the outer sealing member 64 of the filter element 14 is disposed between the body annular flange 72 and the cover annular flange 82 while the inner sealing member 66 is disposed between the body side annular flange member 76 and the cover flat portion 78a. The outer and inner sealing members 64, 66 are secured in position by tightening a bolt 84 passing through the cover central flat portion 78a and the body side bridge member 74 to be engaged with a nut 86 located beneath the bridge member 74. As seen from FIG. 1, the air inlet pipe 80 and the filter element 14 is in such a relationship that the axis of the air inlet pipe 80 is in an imaginary horizontal plane parallel with an imaginary plane containing the upper main score lines 22. Additionally, the air inlet pipe 80 is located in such a level that a major part of the outer bonded section $B_1$ of the pleat 18 is within the extension of the inside opening of the air inlet pipe 80.

With the thus arranged air filter 10, during engine operation, air containing dust and the like is sucked through the air inlet pipe 80 into the inside of the casing 12 and guided along the outer periphery of the annular filter medium 16 through an annular space formed between the inner peripheral surface of the cover 78 and the outer periphery of the annular filter medium 16. The thus guided air flows nearly along the length of each pleat 18, accomplishing filtering of dust and the like. Additionally, the guided air flows through the upper face (containing the upper main score lines 22) of the filter medium 16 and directed nearly along the length of each pleat 18, accomplishing filter of dust. In other words, air to be filtered by the filter medium 16 is introduced from the vicinity of the outer bonded sections $B_1$ of the pleats 18 then to flow through an elongate space formed between the adjacent pleats 18, 18, and passes through the filter medium 16 in the vicinity of the inner bonded sections $B_2$ to be supplied to the engine. Accordingly, the air introduced into the filter casing 12 flows nearly along a gentle parabola connecting the air inlet pipe 80 and the air outlet pipe 70.

Therefore, according to the first embodiment fluid filter, the following significant advantages are obtained by virtue of the filter medium configurated such that the upwardly-pointing pleat and the downwardly-pointing pleat are alternately closed and opened at their opposite ends. (1) The adjacent pleats are separate from each other to form a clearance therebetween even at the inner periphery of the annular filter medium. Accordingly, although the pitch of the pleats at the filter medium inner periphery is considerably smaller as compared with at the filter medium outer periphery, a sufficient surface area can be obtained even at the filter medium inner periphery, so that the flow resistance of fluid to be filtered and the life of the filter do not depend on the pleat pitch at the inner periphery of the filter medium. This makes effective lowering fluid flow resistance and prolong filter life by measures of increasing the width of each pleat and of increasing the number of the pleats. (2) Since the fluid passing through the filter medium flows nearly along the gentle parabola, the direction of flow of the fluid does not abruptly change in the filter, thereby lowering fluid flow resistance. (3) Even in case where the fluid passes through the filter medium at a high speed or clogging of the filter medium progresses, the adjacent pleats are prevented from close contact with each other, thereby maintaining a higher effective filtering area. (4) Since the fluid flows nearly along the length of each pleat, the fluid is uniformly distributed throughout whole the surface of the filter media, so that filtration rate is uniformalized throughout whole the filter media. This improves the filtering accuracy and prolongs the life of the filter. (5) In a state where the filter element is installed in the casing, large volume spaces are fomred on the respective upstream and downstream sides of the filter element, and therefore pressure distribution is uniformalized on the upstream and downstream sides.

FIGS. 6 to 10 illustrate a second embodiment of the fluid filter (air filter) according to the present invention, which is similar to the first embodiment of FIGS. 1 to 5C with the exception that the filter medium 16 is arranged straight and flat so that the upper and lower main score lines 22, 24 are parallel with each other. In this embodiment, the first and second bonded sections $B_1$, $B_2$ are substantially the same in length. Additionally, the edge 30 and the edge 42 of the first and second inclined walls 28, 40 are nearly the same in length with each other. The first and second oblique score lines 32a, 32b of the first inclined wall 28 are nearly the same in length as the third and fourth oblique score lines 44a, 44b of the second inclined walls 40, respectively. As best seen from FIG. 9, the initial end 60 and the terminal end 62 of the filter medium 16 is so bent along a line connecting the point 36 and the point 50 to be laterally extend.

A rectangular frame-like resilient sealing member 90 is provided to be incorporated with the filter medium 16 thereby to form a rectangular and flat filter element 16. The resilient sealing member is formed of a relatively soft plastic such as foamed polyurethane resin or polyvinyl chloride, and includes first and second parallel elongate sections 90a, 90b, and third and fourth parallel elongate sections 90c, 90d. As shown in FIGS. 6 and 7, the outward section of each first inclined wall 28 and the lower-most portion of each first bonded section $B_1$ are embedded in the first elongate section 90a. Similarly, the outward section of each second inclined wall 40 and the lower-most portion of each second bonded section $B_2$ are embedded in the second elongate section 90b. Additionally, the initial and terminal ends of the filter medium 16 are embedded in the third and fourth elongate sections 90c, 90d, respectively. The frame-like sealing member 90 is located inclined relative to a plane containing the upper or lower main score lines 22, 24 as best seen from FIG. 8. It will be understood that the filter medium 16 of this embodiment is formed and incorporated with the sealing member 90 in a similar manner to of the first embodiment, thus producing the filter element 14. The thus produced filter element 14 is securely and sealingly installed in the casing 12'. The casing 12' consists of a body 68' provided with an air outlet pipe 70' and formed at its upper periphery with a rectangular frame-like flange 72'. A cover 78' is provided with the air inlet pipe 80' and formed at its lower periphery with a rectangular frame-like flange 82' facing the flange 72' of the body 68'. The rectangular frame-like sealing member 90 is interposed between the flanges 72', 82' and secured in position by using connecting means such as wire-clips 92.

Figure 11:
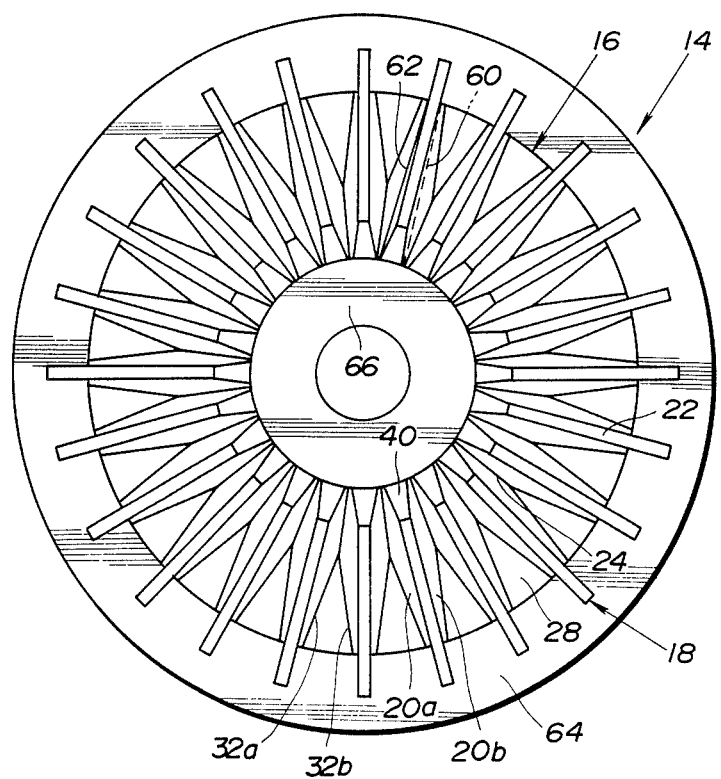
FIG. 11 is a plan view of a filter element of a third embodiment of the fluid filter according to the present invention.
Figure 12:
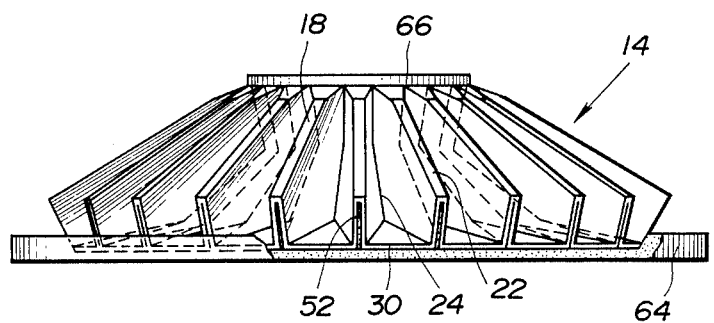
FIG. 12 is a front elevation of the filter element of FIG. 11.
Figure 13:
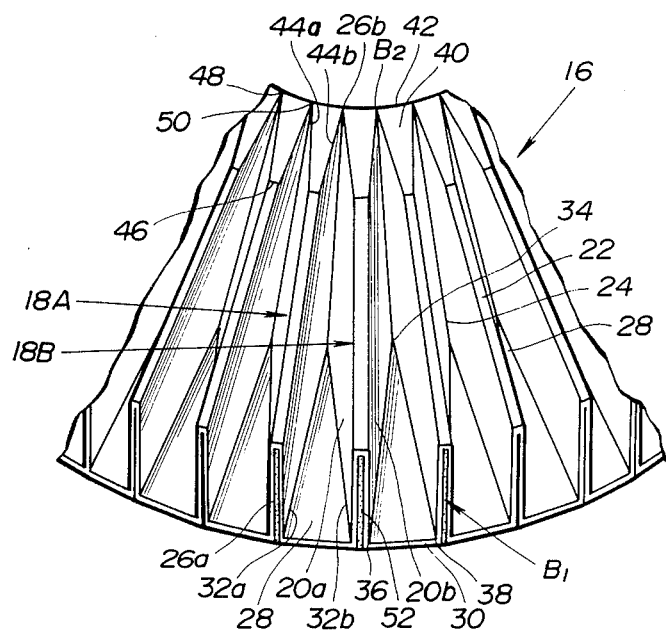
FIG. 13 is a fragmentary perspective view of a filter medium of the filter element of FIG. 11.
Figure 14:
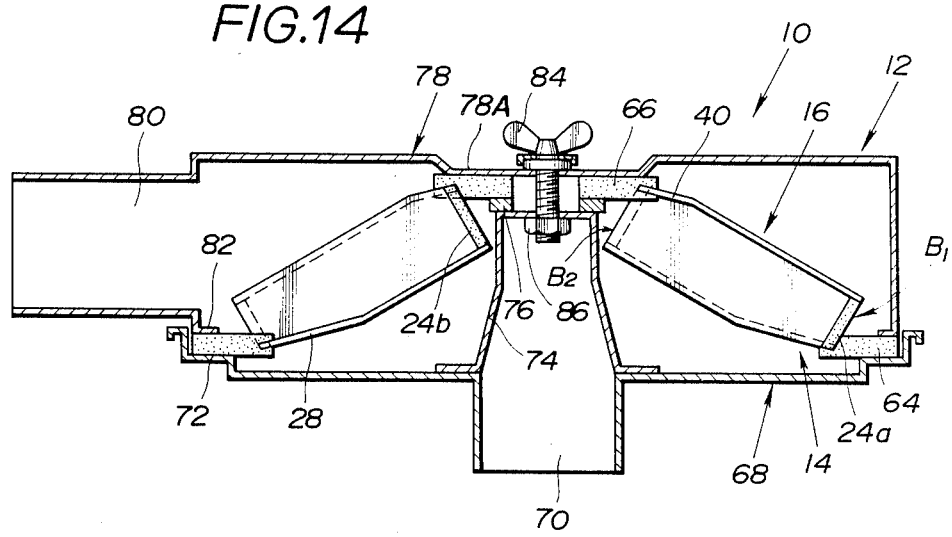
FIG. 14 is a vertical sectional view of the third embodiment fluid filter.

FIGS. 11 to 14 illustrate a third embodiment of the fluid filter (air filter) similar to the first embodiment of FIGS. 1 to 5C mainly with the exception that the filter medium 16 is generally of the frusto-conical shape. In order to form the filter medium 16 frusto-conical, the length of the outer bonded section $B_1$ is smaller than that of the inner bonded section $B_2$, so that the length of the edge 30 of the outer inclined wall 28 is larger than that of the edge 42 of the inner inclined wall 40 as seen from FIGS. 13 and 14. Additionally, in this embodiment, the length of the first and second oblique score lines 32a, 32b defining the outer inclined wall 28 is larger than those in the first embodiment. Such a filter medium 16 is incorporated with the outer and inner resilient seal members 64, 66 to produce the filter element 14 as shown in FIGS. 11, 12 and 14, in which the outer peripheral section of each outer inclined wall 28 and the lower-most portion of the outer bonded section $B_1$ are embedded in the outer sealing member 64 while the inner peripheral section of each inner inclined wall 40 and the lower-most section of the inner bonded section $B_2$ are embedded in the inner sealing member 66. The filter element 14 is securely and sealingly installed in the casing 10 in such a manner that the outer sealing member 64 is securely put between the annular flanges 72, 82 of the body 68 and the cover 78 while the inner sealing member 66 is securely put between the body side annular flange 76 and the depressed flat portion 78a of the cover 78 as shown in FIG. 14. In this embodiment, the casing 12 is formed deeper to house the frusto-conical filter element 14, thus obtaining dirty and clean side spaces of larger volumes, formed upstream and downstream of the filter element 14, respectively, within the casing 12.

Figure 15:
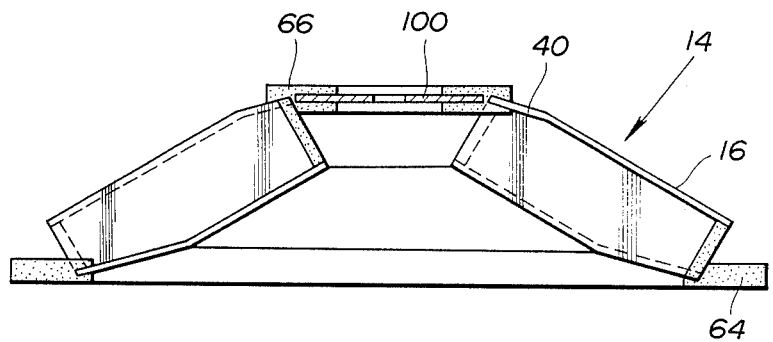
FIG. 15 is a vertical sectional view of a filter element of a fourth embodiment of the fluid filter according to the present invention.

FIG. 15 illustrates an essential part of a fourth embodiment of the fluid filter (air filter) according to the present invention, which is similar to the third embodiment with the exception that a rigid annular plate 100 is embedded in the inner annular resilient sealing member 66. This sealing member 66 is inserted together with a part of the filter medium 10 during molding of the inner sealing member 66. According to this embodiment, the inner sealing member 66 may be directly attached to the bridge member 74 or directly put between the bridge member 74 and the inner surface of the cover 78 to be secured in position, for example, by means of bolt-and-nut connection.

Figure 16:
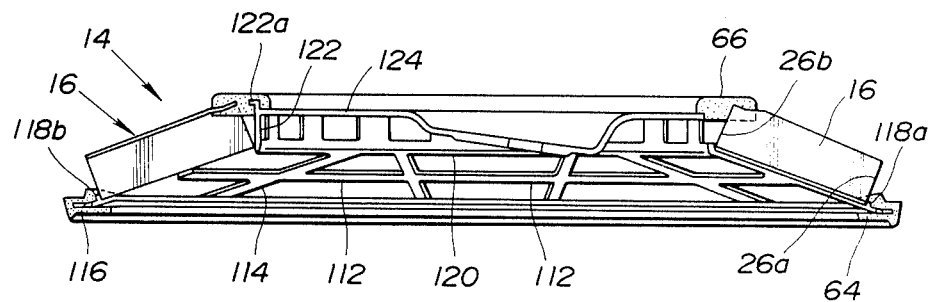
FIG. 16 is a front elevation of a filter element provided with a filter medium support structure, of a fifth embodiment of the fluid filter according to the present invention.
Figure 17:
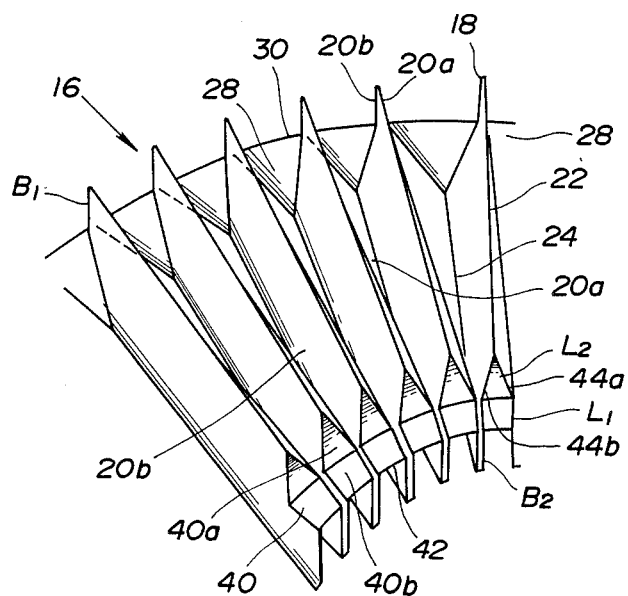
FIG. 17 is a fragmentary perspective view of a filter medium of the filter element of FIG. 16.

FIGS. 16 to 21 illustrate a fifth embodiment of the fluid filter (air filter) according to the present invention, which is similar to the third embodiment of FIGS. 11 to 14 mainly except for provision of a generally frusto-conical skeletal support structure 110 on which the generally frusto-conical filter medium 16 is securely disposed to form the filter element 14. The support structure 110 of this embodiment is in one-piece construction. As shown in FIG. 17, each inner inclined wall 40 consists of a triangular section 40a and a rectangular section 40b. The rectangular section 40b is defined by two nearly parallel score lines $L_1$, $L_2$ which form part of third and fourth oblique score lines 44a, 44b, respectively. The score lines $L_1$, $L_2$ may not be parallel. The parallel score lines $L_1$, $L_2$ have the same length and extend nearly parallel (or with a slight inclination) with the upper main score 22 of the pleat 18 formed with the rectangular section 40b, thereby making the rectangular section generally flat or generally parallel with the upper main score line 22.

Figure 18:
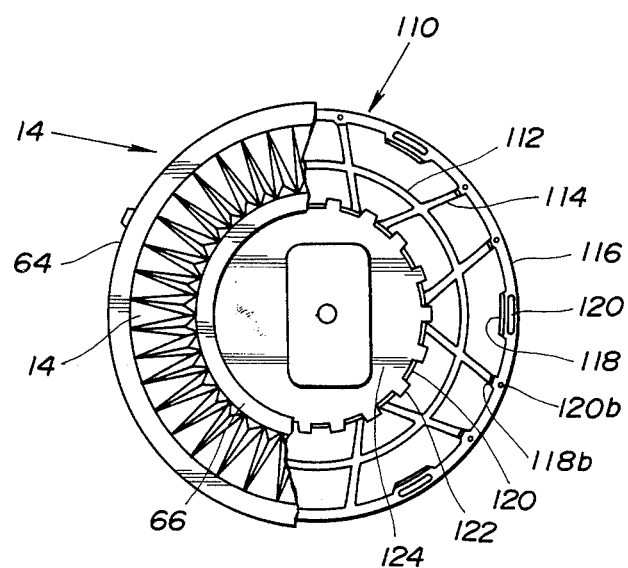
FIG. 18 is a plan view of the filter element of FIG. 16 showing the structure of the filter medium and the support structure.
Figure 19:
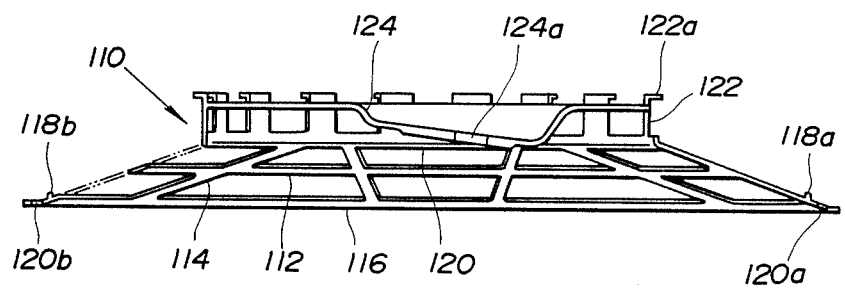
FIG. 19 is a front elevation of the support structure of FIG. 16.

As best shown in FIGS. 18 and 19, the support structure 110 is generally in the frusto-conical shape and includes an annular beam section 112. A plurality of straight beam sections 114 are integrally connected with the annular beam section 112. The filter medium 16 is mounted on the beam sections 112, 114. In this regard, each straight beam section 114 is formed inclined relative to an imaginary radial vertical plane (not identified) in order that the downwardly-pointing pleat is prevented from covering with the straight beam section 114 and that many downwardly-pointing pleats can be supported by each straight beam section 114. Each straight beam section 114 has a rectangular cross-section or may has a circular cross-section in order to reduce flow resistance of the fluid passing through the filter element 14.

A lower support ring 116 is so provided to be integrally connected with the lower ends of the respective straight beam sections 114. The lower support ring 116 is formed with a plurality of long projections 118a and a plurality of short projections 118b. Each long projection 118a extends along the lower support ring 116 and located midway between two portions to which the lower ends of the adjacent two straight beam sections 114 are integrally connected. Each short projection 118b is located at a portion to which the lower end of each straight beam section 114. Additionally, the lower support ring 116 is formed with a plurality of long through-holes 120a and a plurality of short through-holes 120b. Each long through-hole 120a is positioned near the long projection 118a and on the side of the outer periphery of the lower support ring 116. Each short through-hole 120b is positioned near the short projection 118b and on the side of the outer periphery of the lower support ring 116. A upper support ring 120 is so provided as to be integrally connected with the upper ends of the respective straight beam sections 116. The upper support ring 120 is integrally formed with a plurality of vertically extending pillar sections 122 each of which has a outwardly projecting bend portion 122a. Additonally, an upper rid section 124 is provided inside the pillar sections 122 in such a manner as to be integrally connected with the pillar sections 122. The upper rid section 124 is formed at its central part with a bolt-hole 124a.

The outer annular resilient sealing member 64 is made of a foamed polyurethane and so provided that the lower part of the outer peripheral section of the filter medium 16 and the support structure lower support ring 116 are embedded in the sealing member 64. It is to be noted that the peripheral section lower part of the filter medium 16 is in contact and engaged with the projections 118a, 118b as best seen from FIG. 16. In molding the outer sealing member 64, flowable polyurethane having a relatively high vicosity is poured into a metallic mold located at a predetermined position in which the filter medium 16 and the support structure lower support ring 116 are located in respective predetermined positions. The thus poured polyurethane is foamed and thereafter solidified. In this process, since the poured polyurethane is lower in fluidity, the projections 118a, 118b are formed intermittent along the lower support ring 116 in order that the flowable polyurethane can be sufficiently introduced from the upper side to the lower side of the lower support ring 116. The through-holes 120a, 120b are also provided for the same purpose, thereby facilitating supply of the flowable polyurethane from the upper side to the lower side of the lower support ring 116. Thus, the arrangement of projections 118a, 118b and the through-holes 120a, 120b contributes to facilitating the molding of the outer sealing member 64 and to formation of the integral structure of the outer sealing member 64 in which the sealing member upper part located on the lower support ring and the sealing member lower part located beneath the same are securely integral with each other, thus preventing the sealing member 64 from being peeled off from the lower support ring 116 while avoiding failed fluid seal.

The annular resilient inner sealing member 66 is made of a foamed polyurethane and so provided that the upper part of the inner peripheral section of the filter medium 16 and the upper portion of the support structure pillar sections 122 are embedded in inner sealing member 66. It will be understood that the outer peripheral portion of the upper rid section 124 is also embedded in the upper sealing member 66. The inner sealing member 66 is molded similarly to the outer sealing member 64. It will be understood that, in this embodiment, the bent portion 122a of each pillar section 122 embedded in the inner sealing member 66 secures the connection between the sealing member 66 and the support structure 120, thereby preventing the sealing member 66 from being peeled off from the support structure 110 while avoiding failed fluid seal.

Figure 20:
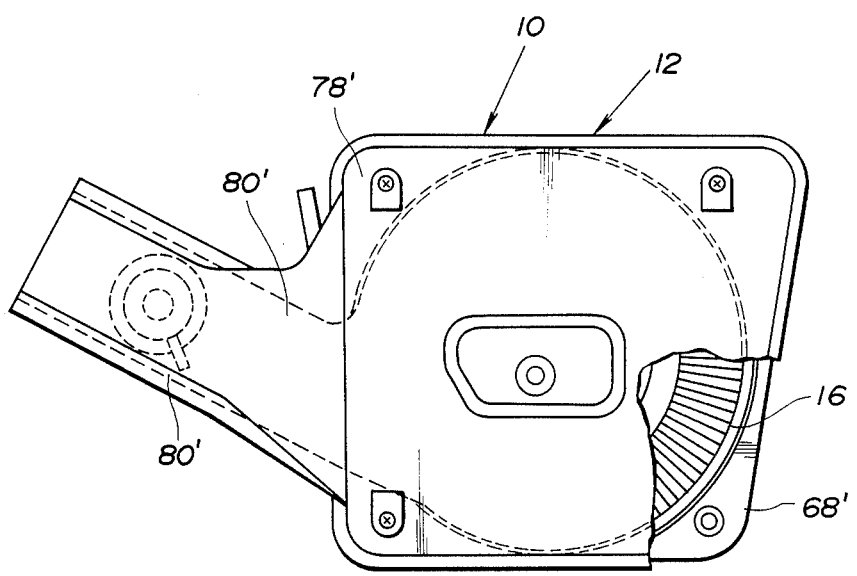
FIG. 20 is a plan view of the fifth embodiment fluid filter according to the present invention.
Figure 21:
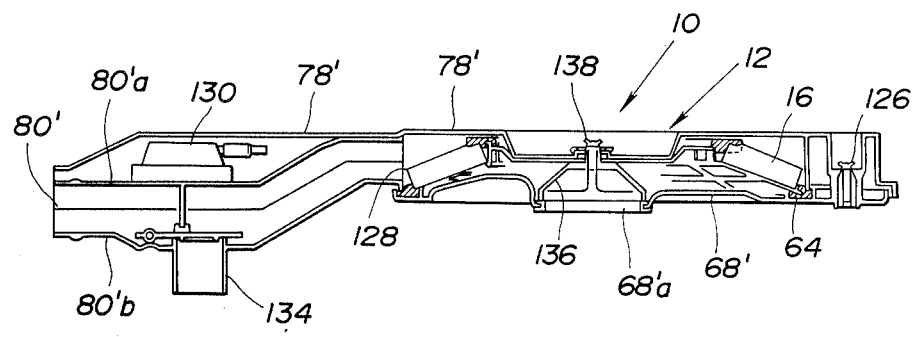
FIG. 21 a vertical sectional view of the fluid filter of FIG. 20.

As seen from FIGS. 20 and 21, the filter element 14 is securely and sealing installed within the casing 12 formed of a plastic material. The casing 12 includes a rectangular box-shaped body 68' formed at its central part with an air outlet opening 68'a. A rectangular box-shaped cover 78' is engaged with the body 68' and secured in position by means of bolts, thus incorporating the body 68' and the cover 78'. The body 68' is integrally formed with an air inlet pipe cover 78'a. An air inlet pipe 80' is secured to the incorporated body 68' and cover 78' so that the inside of the inlet pipe 80' is communicated with the inside of the casing 12 through an opening 128 formed in the casing 12. The air inlet pipe 80' is formed by incorporating upper and lower counterparts 80'a, 80'b by means of press fit. A vacuum motor or vacuum-operated actuator 130 is mounted on the air inlet pipe upper counterpart 80'a and mechanically connected to a damper valve 132 adapted to open or close a heated air intake pipe 134 through which heated air is supplied to the the air inlet pipe 80'.

The filter element 14 is secured in position in such a manner that the support structure upper rid section 124 is forced to a retainer 136 fixed to the body 68' by means of a center bolt 138 passing through the cover 78' and located in the bolt-hole 124a of the upper rid section 124. As shown, the outer sealing member 64 is disposed to be in tight contact with the inner surface of the body 68' under the action of downwardly extending parts of the cover 78' and of the air inlet pipe 80'. The inner sealing member 66 is in tight contact with the inner surface of the cover 78'. It will be understood that the filter element 14 can be installed without any trouble even within such a flat casing 12.

Figure 22:
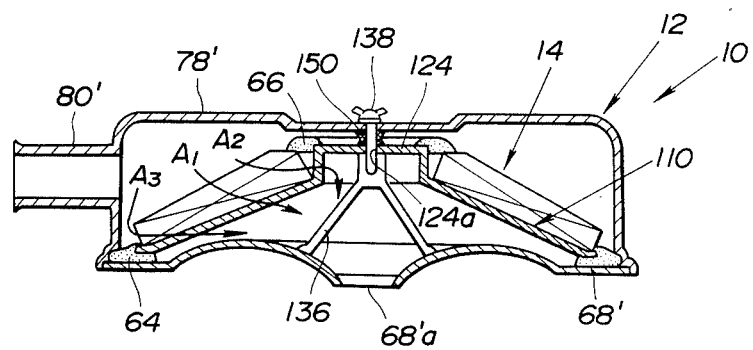
FIG. 22 is a vertical sectional view of a sixth embodiment of the fluid filter according to the present invention.

FIG. 22 illustrates a sixth embodiment of the fluid filter (air filter) according to the present invention which is similar to the fifth embodiment of FIGS. 16 and 21. In this embodiment, the filter element 14 as same as in the fifth embodiment is securely and sealingly disposed within the casing 12. The casing 12 consists of the relatively flat body 68' formed at its centeral part with the air outlet opening 68'a. The generally bowl-like cover 78' provided with the air inlet pipe 80' is securely mounted on the body 68' upon tightening the bolt 138 engaged with the retainer 136. A spacer member 150 is interposed between the cover 78' and the upper rid section 124 of the filter medium support structure 110, so that the upper rid section 124 is brought into tight contact with the retainer 136 while providing a fluid tight seal for the bolt-hole 124a. The outer sealing member 64 is disposed to be in tight contact with the peripheral section of the body 68' under the pressing action of the lower peripheral section of the cover 78'. Accordingly, as illustrated, air sucked into the air filter casing 12 flows, for example, along paths $A_1$, $A_2$ and $A_3$ to be fed to the engine during engine operation.

Figure 23:
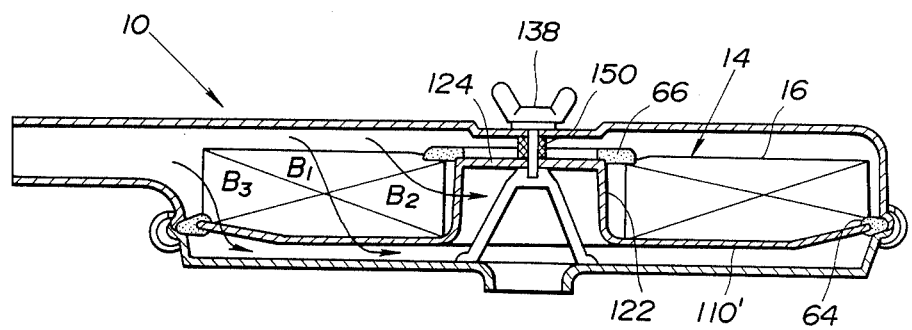
FIG. 23 is a vertical sectional view of a seventh embodiment of the fluid filter in accordance with the present invention.

FIG. 23 illustrates a seventh embodiment of the fluid filter (air filter) according to the present invention which is similar to the sixth embodiment of FIG. 22 with the exception that the annular support beam 112 section and the straight support beam sections 114 of the skeletal filter medium support structure 110' are arranged to be generally flat. The filter medium 16 lies flat on the thus flatly arranged beam sections. In the thus configured air filter 10, air sucked to the inside of the casing 12 flow along paths $B_1$, $B_2$ and $B_3$ to be supplied to the engine.

FIGS. 24 to 27 illustrate an eighth embodiment of the fluid filter (air filter) according to the present invention. In this embodiment, the filter element 14 is securely and sealingly disposed within the casing 12 as shown in FIG. 1. The filter medium 16 of the filter element 14 is generally cylindrical so that the pleats 18 extend parallel with each other to have a first or upper end $E_1$ and a second or lower end $E_2$. The upper end $E_1$ contains the edge 30 of the first inclined wall 28 and the upper edge of each first bonded section $B_1$. The lower end $E_2$ contains the edge 42 of each second inclined wall 40 and the lower edge of each second bonded section $B_2$. Thus, the first inclined walls 28 are formed in contact with the upper end $E_2$, and the second inclined walls 40 are formed in contact with the lower end $E_2$. In this embodiment, each first inclined wall 28 consists of an isosceles-triangular section 28a and a generally rectangular section 28b containing the edge 30. It will be understood that the surface of the rectangular section 28b is inclined to that of the triangular section 28a. Similarly, each second inclined wall 40 consists of an isosceles-triangular section 40a and a generally rectangular section 40b. The surface of the rectangular section 40b is inclined to that of the triangular section 40a.

Figure 25:
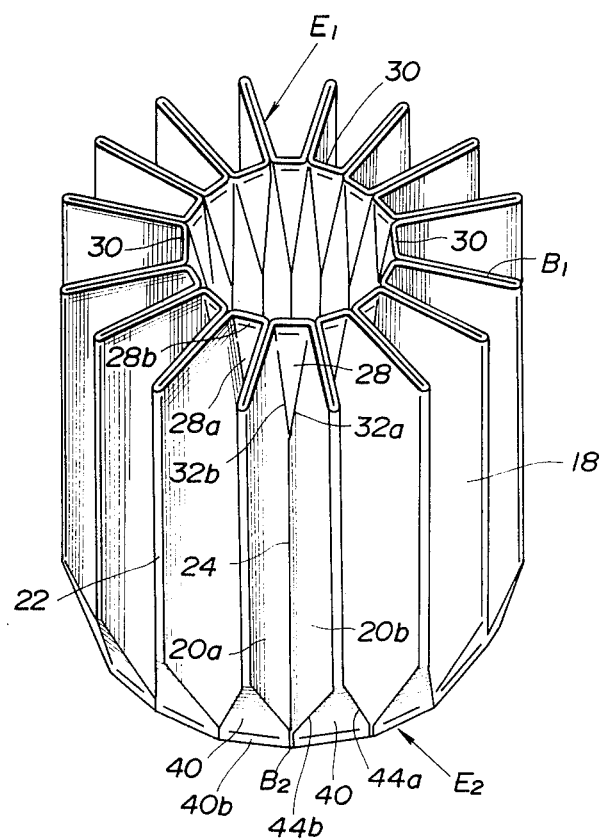
FIG. 25 is a perspective view of a filter medium of a filter element of the fluid filter of FIG. 24.
Figure 26:
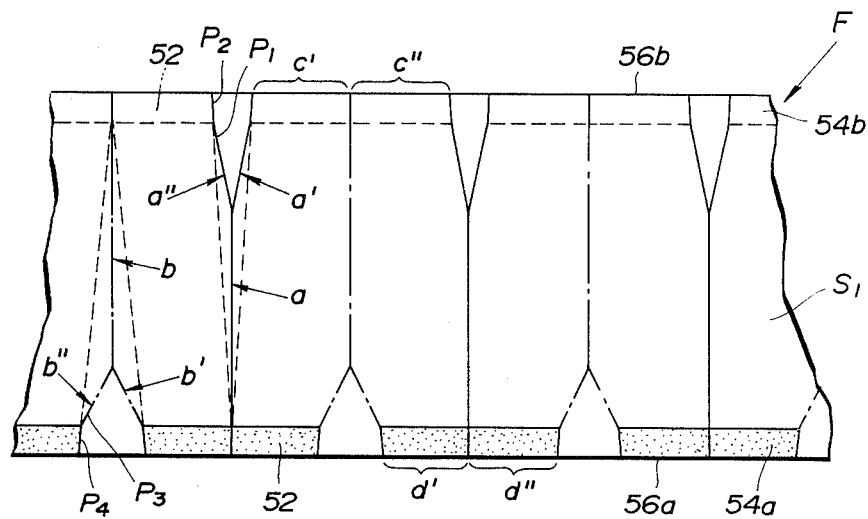
FIG. 26 is an illustration showing a pleating pattern of a flat filter material to form the filter medium of FIG. 25.

FIG. 26 shows a band-type filter material F similar to that of FIG. 5B with the exception that the filter material F is shown upside down relative to that of FIG. 5B. FIG. 26 depicts a pleating patterm of the filter material F to obtain the filter medium shown in FIG. 25, in which the scores a, a', a" indicated by the solid lines are depressed to form the downwardly-pointing pleats while the scores b, b', b" indicated by the broken lines are raised to form the upwardly-pointing pleats. As illustrated, the adhesive 52 is applied on the front side $S_1$ at the lower continuous end section 54a except for the sections each being put between the scores b, b". Additionally, the adhesive 52 is applied on the reverse side $S_2$ at the upper continuous end section 54b except for the sections each being put between the scores a', a".

In this pleating pattern of FIG. 26, each of the scores a', a" is bent to have first and second portions $P_1$, $P_2$. The portions $P_1$, $P_1$ of the a', a" define an isosceles-triangular area which corresponds to the isosceles-triangular section 28a of the first inclined wall 28 of the filter medium 16 shown in FIG. 25. The portions $P_2$, $P_2$ of the scores a', a" define a rectangle-like area which corresponds to the generally triangular section 28b of the first inclined wall 28 of the filter medium 16 shown in FIG. 25. As shown, the portion $P_2$ of the scores a', a" is so formed that the extension thereof passes through a point where the score a intersects the lower edge of the upper continuous end section 54a. Similarly, each of the scores b', b" is bent to have third and fourth portions $P_3$, $P_4$. The portions $P_3$, $P_4$ of the scores b', b" define an isosceles-triangular area which corresponds to the isosceles-triangular section 40a of the second inclined wall 40 of the filter medium 16 shown in FIG. 25. The portions $P_4$, $P_4$ of the scores b', b" define a rectangle-like area which corresponds to the generally rectangular section 40b of the second inclined wall 40 of the filter medium 16 shown in FIG. 25. As shown in FIG. 26, the portions $P_4$ of the scores b', b" is so formed that the extension (indicated by a dotted line) thereof passes through a point where the score b intersects the upper edge of the lower continuous end section 54a. The filter material F is pleated along the scores patterned as shown in FIG. 26 to be shaped as shown in FIG. 27.

Figure 24:
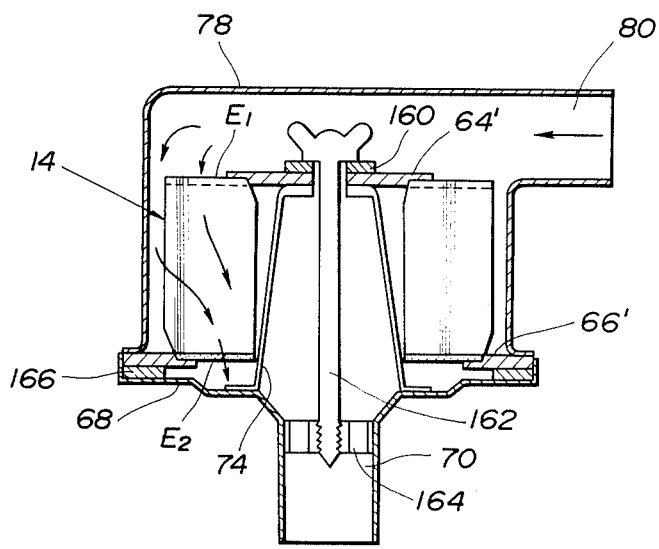
FIG. 24 is a vertical sectional view of an eighth embodiment of the fluid filter in accordance with the present invention.

The thus shaped filter material F is thereafter formed into the annular shape as shown in FIG. 25 by bonding the initial end and the terminal end of filter material F. As seen from FIG. 24, the first (upper) annular resilient sealing member 64' is so provided that the generally rectangular section 28b of each first inclined wall 28 and the radially inward portion of each first bonded section $B_1$ are embedded in the upper sealing member 64'. The upper sealing member 64' extends radially inwardly and parallel with the upper end $E_1$ of the annular filter medium 16. Additionally, the second (lower) annular resilient sealing member 66' is so provided that the generally rectangular section 40b of each second inclined wall 40 and the radially outward portion of each second bonded section $B_2$ are embedded in the lower sealing member 66'. The lower sealing member 66' extends radially outwardly and parallel with lower end $E_2$. As shown in FIG. 24, the upper sealing member 64' is secured through a packing 160 to the bridge 74 by tightening a center bolt 162 engaged with a bridge 164 fixed inside the air outlet pipe 70. The lower sealing member 66' is put between the outer peripheral sections of the body 68 and the cover 78 through a packing 166. Accordingly, air sucked through the air inlet pipe 80 flows as indicated by arrows and passes through the filter element 14 to be supplied through the air outlet pipe 70 to the engine.

Figure 28:
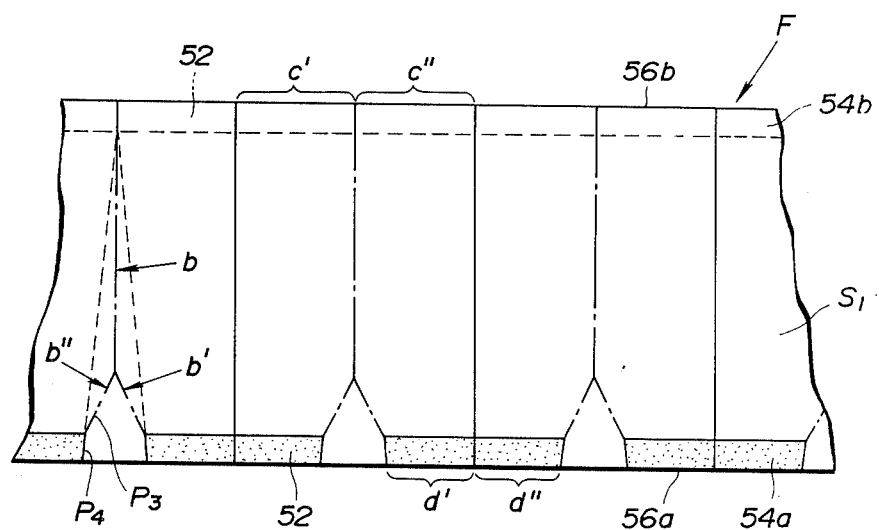
FIGS. 28 to 30 are illustrations similar to FIG. 26 but showing further pleating patterns of a flat filter material to form filter mediums similar to that of FIG. 25.
Figure 29:
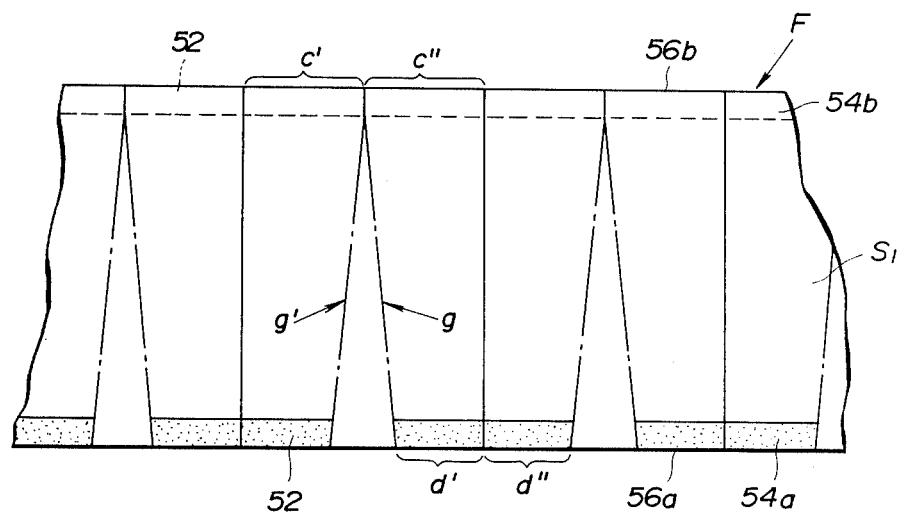
Figure 30:
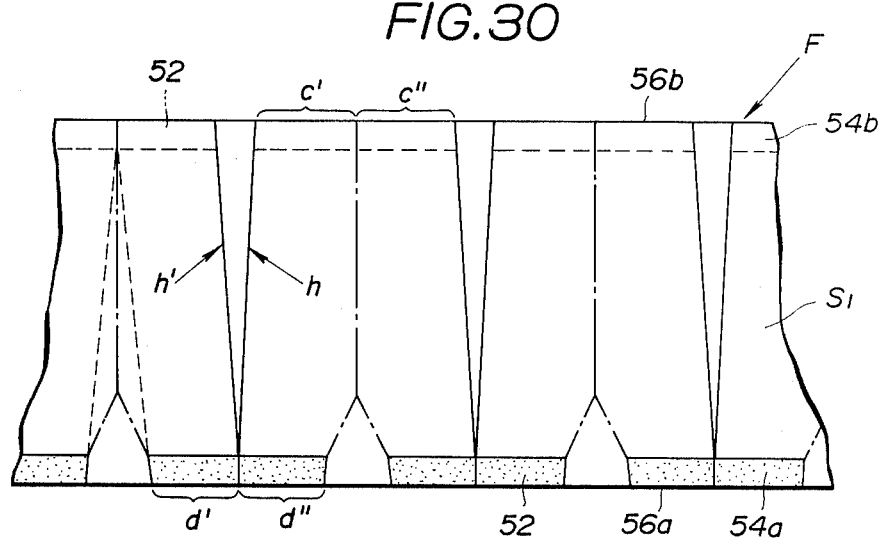

FIGS. 28 to 30 show a variety of pleating patterns of the filter material F to form annular filter medium 16 like one shown in FIG. 25.

Figure 27:
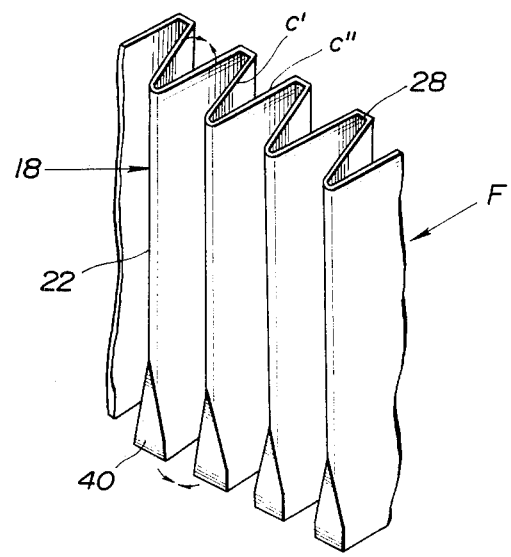
FIG. 27 is a fragmentary perspective view of the filter medium after pleated according to the pleating pattern of FIG. 26.

The pattern of FIG. 28 is similar to that shown in FIG. 27 with the exception that the scores a', a" are omitted while the score a extends to reach the lower edge 56a of the filter material F.

The pattern of FIG. 29 is similar to that shown in FIG. 28 with the exception that the scores b, b' and b" are omitted and replaced with scores g, g' each extending from the filter material lower edge 56a to the lower edge of the upper continuous end section 54b. The scores g, g' define an isosceles-triangular area which corresponds to the second inclined wall 40 formed on the top of each pleat 18.

The pattern of FIG. 30 is similar to that of FIG. 27 with the exception that the scores a, a', a" are replaced with scores h, h' each extending from the filter material upper edge 56b to the upper edge of the lower continuous end section 54a. The scores h, h' defines an isosceles-triangular area corresponding to the first inclined wall 28.

Figure 31:
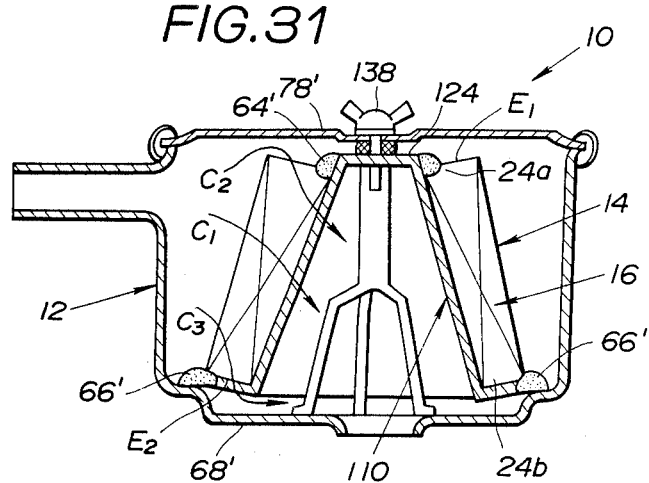
FIG. 31 is a vertical sectional view of a ninth embodiment of the fluid filter in accordance with the present invention.

FIG. 31 illustrates a ninth embodiment of the fluid filter (air filter) according to the present invention. In this embodiment, filter medium 16 similar to that of FIG. 25 (the eighth embodiment) is securely attached on the skeletal filter medium support structure 110 similar to that of FIG. 19 (the fifth embodiment) to form the filter element 14. The filter medium 16 of this embodiment is generally frusto-conical and located on the generally frusto-conical section 110a of the support structure 110. As seen, the inner peripheral section of the filter medium 16 at the first end $E_1$ is embedded in the first sealing member 64' in which the top section of the support structure 110 is embedded. The outer peripheral section of the filter medium 16 at the second end $E_2$ is embedded in the second sealing member 66' in which the bottom peripheral section of the support structure 110 is embedded. In this embodiment, the thus configurated filter element 14 is secured and sealingly disposed in the deep bowl-like body 68' in such a manner that the second sealing member 66' is in tight contact with the inner surface of the body 68'. The body 68' is provided with the air inlet pipe 80'. The flat cover 78' is detachable installed to the body 68' by means of the bolt 150 engaged with the retainer 136. Accordingly, air sucked into the casing 12 flows along paths indicated by $C_1$, $C_2$, and $C_3$ to be supplied to the engine.

Figure 32:
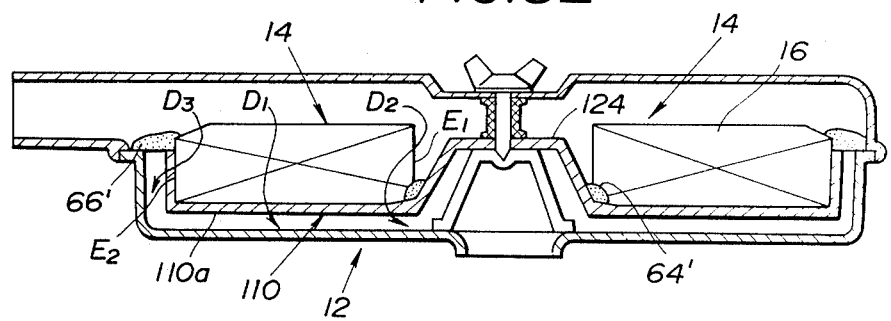
FIG. 32 is a vertical sectional view of a tenth embodiment of the fluid filter in accordance with the present invention.

FIG. 32 illustrates a tenth embodiment of the fluid filter (air filter) according to the present invention which is similar to the ninth embodiment of FIG. 31 with the exception that the annular filter medium 16 is formed flat and securely disposed on the flat section 110a of the skeletal filter medium support structure 110 to form the filter element 14. The lower section of the first (inner) end $E_1$ of the annular filter medium 16 is securely connected through the first sealing member 64' to the inner section of the support structure 110. The upper section of the second (outer) end $E_2$ of the annular filter medium 16 is securely connected through the second sealing member 66' to the outer peripheral section of the support structure 110. In the thus configurated air filter 10, air sucked into the casing 12 flows along paths indicated by $D_1$, $D_2$, and $D_3$ and supplied to the engine.

While the edge 30, 42 of the first or second inclined wall 28, 40 has been shown and described as being straight, it will be understood that the edge may be bent upwardly or downwardly upon increasing the length of the edge while decreasing the length of the first and second bonded sections $B_1$, $B_2$. Additionally, at least one of the first and second inclined walls 28, 40 may be cut off and therefor covered with the sealing member 64, 66. It will be appreciated that the angle formed between the first and second sides 20a, 20b of each pleat 18 is suitably selectable depending upon kind and amount of fluid to be filtered, and allowable space for the filter element, and that an additional seal member may be used in case where the seal members 64, 66 are formed of a material having no resiliency. Although only air filters have been shown and described as the embodiments according to the present invention, it will be appreciated that the principle of the present invention is applicable to a variety of filters such as lubricating oil, hydraulic fluid, and fuel filters used in automotive internal combustion engines.

What is claimed is:

1. A fluid filter for an automotive engine, comprising a filter element including a pleated filter medium having a plurality of pleats, said plurality of pleats defining adjacent pairs of first and second pleats, each pleat having first and second sides which are integrally connected through a first score line with each other to form an upwardly-pointing pleat portion, the second side of said first pleat and the first side of said second pleat being integrally connected through a second score line with each other to form a downwardly-pointing pleat portion, each pleat side having oppositely located first and second end sections which have first and second edges, respectively, which extend substantially perpendicular to each score line, the first end sections of said first and second sides of each pleat being approached and bonded to each other to form a plurality of first bonded sections, the second end section of said first pleat second side and the second end section of said second pleat first side, of said adjacent pairs of first and second pleats, being approached and bonded to each other to form a plurality of second bonded sections.

2. A fluid filter as claimed in claim 1, further comprising at least one of first and second inclined walls, said first and second inclined walls being inclined to said second score line and said first score line, respectively, said first inclined wall being formed between said first pleat second side and said second pleat first side, said first inclined wall having an edge contiguous to the first edges of said first and second pleats, said first inclined wall being integrally connected through a third score line with said first pleat second side and through a fourth score line with said second pleat first side, the third score line connecting an end point of the second score line and a first point lying at border between the first edge of said first pleat second side and the edge of said first inclined wall, the fourth score line connecting the second score line end point and a second point lying at border between the first edge of said second pleat first side and the edge of said first inclined wall, said second inclined wall being formed between said first and second sides of each pleat, said second inclined wall having an edge contiguous to the second edges of said first and second sides of each pleat, said second inclined wall being integrally connected through a fifth score line with said first side and through a sixth score line with said second side, said fifth score line connecting an end point of the first score line and a third point lying at border between the second edge of said first side and the edge of said second inclined wall, said sixth score line connecting the first score line end point and a fourth point lying at border between the second edge of the second side and the edge of said second inclined wall.

3. A fluid filter as claimed in claim 2, wherein at least one of said first and second inclined walls includes a triangular section defined by said third and fourth score lines, and a nearly rectangular section defined by the edge of said inclined wall, said rectangular section being inclined relative to said triangular section.

4. A fluid filter as claimed in claim 2, further comprising first and second sealing members, said first sealing member being so disposed that a portion of said plurality of first bonded sections is embedded in said first sealing member, said plurality of second sealing members being so disposed that a portion of said second bonded section is embedded in said second sealing member, remaining portion of each of first and second bonded sections being exposed to fluid to be filtered.

5. A fluid filter as claimed in claim 4, wherein the edge of said first inclined wall is embedded in said first sealing member.

6. A fluid filter as claimed in claim 4, wherein the edge of said second inclined wall is embedded in said second sealing member.

7. A fluid filter as claimed in claim 1, further comprising first and second sealing members, said first sealing member being so disposed that a portion of said plurality of first bonded sections is embedded in said first sealing member, said second sealing member being so disposed that a portion of said plurality of second bonded sections is embedded in said second sealing member, remaining portion of each of said first and second bonded sections being exposed to fluid to be filtered.

8. A fluid filter as claimed in claim 7, wherein said first and second sealing members are made of a material having a resiliency.

9. A fluid filter as claimed in claim 8, wherein said material is one selected from the group consisting of foamed polyurethane and polyvinyl chloride.

10. A fluid filter as claimed in claim 7, further comprising a casing in which said filter element is securely and sealingly disposed.

11. A fluid filter as claimed in claim 10, wherein said casing including at least means for forming a flow path of fluid to be filtered, said flow path passing between said first bonded sections, said means including an air inlet pipe forming part of said casing.

12. A fluid filter as claimed in claim 10, wherein said filter medium is formed straight and flat, wherein said first and second sealing members are straight and extending outwardly.

13. A fluid filter as claimed in claim 10, wherein said filter medium is formed annular, wherein said first and second sealing members are annular, said first sealing member extending radially and outwardly, said second sealing member extending radially inwardly.

14. A fluid filter as claimed in claim 13, wherein said casing including first fixing means for fixing said first sealing member to the inner surface of said casing maintaining fluid tight seal, and second fixing means for fixing said second sealing member to inner surface of said casing maintaining fluid tight seal.

15. A fluid filter as claimed in claim 13, wherein said annular filter medium is arranged flat so that the first score lines of said pleats are on a flat plane through which and axis of said filter element passes.

16. A fluid filter as claimed in claim 13, wherein said annular filter medium is arranged generally frusto-conical so that the first score lines of all said pleats are on a frusto-conical plane.

17. A fluid filter as claimed in claim 10, where said filter medium is formed generally cylindrical so that the first score lines of all said pleats extend parallel with each other, a part of each first bonded section forming a first end of said cylindrical filter medium, a part of each second bonded section forming a second end of said cylindrical filter medium.

18. A fluid filter as claimed in claim 17, wherein said first and second sealing members are annular, said first sealing member extending radially and outwardly, said second sealing member extending radially and outwardly.

19. A fluid filter as claimed in claim 10, wherein said filter medium is formed annular, wherein said first and second sealing members are formed annular, wherein said filter element further including a skeletal filter medium support structure on which said annular filter medium is securely mounted, said support structure including a lattice-like section formed of a plurality of beam sections.

20. A fluid filter as claimed in claim 19, wherein said beam sections include an annular beam section and a plurality of straight beam sections each straight extending and crossing said annular beam section.

21. A fluid filter as claimed in claim 20, wherein straight beam section is inclined relative to a vertical radial plane of said filter element.

22. A fluid filter as claimed in claim 21, wherein said annular filter medium is arranged generally frusto-conical, wherein said support structure further includes upper and lower annular support sections between which said annular beam section is located, each of said straight beam section having a first end connected to said upper suport section and a second end connected to said lower support section.

23. A fluid filter as claimed in claim 22, wherein said support structure includes a plurality of straight pillar sections extending from said upper support section.

24. A fluid filter as claimed in claim 23, wherein said support structure includes a rid section connected to said pillar sections to cover a space defined by said pillar sections.

25. A fluid filter as claimed in claim 22, wherein said lower annular support section is formed with a plurality of projections to which edge of said filter medium contacts.

26. A fluid filter as claimed in claim 25, further comprising means defining a plurality of through-holes in said lower support section, each through-hole being located near each projection.

27. A fluid filter as claimed in claim 1, further comprising means for forming a first flow path of fluid to be filtered, said first flow path passing between said first bonded sections.

28. A fluid filter as claimed in claim 27, further comprising means for forming a second flow path of said fluid, said second flow path extending between said first and second pleats along length of each pleat.

29. A fluid filter as claimed in claim 28, further comprising means for forming a third flow path of said fluid, said third flow path extending passing through a part of said filter medium, said part including said first pleat second side near and contiguous to said second bonded section, and said second pleat first side near and contiguous to said second bonded section.

30. A fluid filter for an automotive engine, comprising a filter element including:
a pleated filter medium having a plurality of pleats, said plurality of pleats defining adjacent pairs of first and second pleats, each pleat having first and second sides which are integrally connected through a first score line with each other to form an upwardly-pointing pleat portion, the second side of said first pleat and the first side of second pleat being integrally connected through a second score line with each other to form a downwardly-pointing pleat portion, each pleat side having oppositely located first and second end sections which have first and second edges, respectively, which extend substantially perpendicular to each score line, the first end sections of said first and second sides of each pleat being approached and bonded to each other to form a plurality of first bonded sections, the second end section of said first pleat second side and the second end section of said second pleat first side, of said adjacent pairs of first and second pleats, being approached and bonded to each other to form a plurality of second bonded sections;

first and second sealing members, said first sealing member being so disposed that a portion of said plurality of first bonded sections is embedded in said first sealing member, said second sealing member being so disposed that a portion of said plurality of second bonded sections is embedded in said second sealing member, the remaining portion of each of said first and second bonded sections being exposed to fluid to be filtered; and a support member for supporting said filter medium and connecting said first and second sealing members.

31. A fluid filter for an automotive engine, comprising a filter element including:
a pleated filter paper having a plurality of pleats, said plurality of pleats defining adjacent pairs of first and second pleats, each pleat having first and second sides which are integrally connected through a first score line with each other to form an upwardly-pointing pleat portion, the second side of said first pleat and the first side of said second pleat being integrally connected through a second score line with each other to form a downwardly-pointing pleat portion, each pleat side having oppositely located first and second end sections which have first and second edges, respectively, which extend substantially perpendicular to each score line, the first end sections of said first and second sides of each pleat being approached and bonded to each other to form a plurality of first bonded sections, the second end section of said first pleat second side and the second end section of said second pleat first side, of said adjacent pairs of first and second pleats, being approached and bonded to each other to form a plurality of second bonded sections;

at least one of first and second inclined walls, said first inclined wall being formed between said first pleat second side and said second pleat first side, said first inclined wall having an edge contiguous to the first edges of said first and second pleats, said first inclined wall being integrally connected through a third score line with said first pleat second side and through a fourth score line with said second pleat first side, the third score line connecting an end point of the second score line and a first point lying at border between the first edge of said second pleat first side and the edge of said first inclined wall, the fourth score line connecting the second score line end point and a second point lying at border between the first edge of said first pleat second side and the edge of said first inclined wall; the fourth score line said second inclined wall being formed between said first and second side of each pleat, said second inclined wall having an edge contiguous to the second edges of said first and second sides of each pleat, said second inclined wall being integrally connected through a fifth score line with said first side and through a sixth score line with said second side, said fifth score line connecting an end point of the first score line and a third point lying at border between the second edge of said first side and the edge of said second inclined wall, said sixth score line connecting the first score line end point and a fourth point lying at border between the second edge of the second side and the edge of said second inclined wall;

first and second sealing members, said first sealing member being so disposed that a portion of said plurality of first bonded sections is embedded in said first sealing member, said second sealing member being so disposed that a portion of said plurality of second bonded sections is embedded in said second sealing member, the remaining portion of each of said first and second bonded sections being to be exposed to fluid to be filtered; and a skeletal filter paper support structure on which said filter paper is securely supported, said support structure connecting said first and second sealing members to maintain a predetermined locational relationship between said first and second sealing members.

* * * * *